US010414477B2

(12) United States Patent
Himmelmann

(10) Patent No.: US 10,414,477 B2
(45) Date of Patent: Sep. 17, 2019

(54) PULSED POWER HYBRID ELECTRIC UNMANNED UNDERWATER VEHICLE PROPULSION SYSTEM

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/631,248

(22) Filed: Jun. 23, 2017

(65) Prior Publication Data

US 2018/0370608 A1 Dec. 27, 2018

(51) Int. Cl.
*H02K 11/00* (2016.01)
*B63G 8/12* (2006.01)
*F42B 19/22* (2006.01)
*F42B 19/24* (2006.01)
*F42B 19/30* (2006.01)
(Continued)

(52) U.S. Cl.
CPC ............ *B63G 8/12* (2013.01); *B60L 50/50* (2019.02); *B63G 8/001* (2013.01); *F42B 19/22* (2013.01); *F42B 19/24* (2013.01); *F42B 19/30* (2013.01); *H02K 7/14* (2013.01); *H02K 7/1823* (2013.01); *H02K 11/33* (2016.01); *H02P 27/06* (2013.01); *B60L 2200/32* (2013.01);
(Continued)

(58) Field of Classification Search
CPC .......... H02K 11/33; H02P 27/06; B63G 8/12; B63G 2008/002; B63G 2758/00; B63G 8/001

USPC .......... 322/24, 28; 307/84; 290/4 R; 363/178
See application file for complete search history.

(56) References Cited

U.S. PATENT DOCUMENTS 2,237,384 A * 4/1941 Alexanderson ........... H02P 4/00
                                                  318/139
3,764,815 A * 10/1973 Habock ................... F01D 19/00
                                                  290/38 R
(Continued)

FOREIGN PATENT DOCUMENTS

EP     2928068       10/2015
JP     2009137411    6/2009

OTHER PUBLICATIONS

Peters, Jonathan A., Summary of Recent Hybrid Torpedo Powerplant Studies, Technical Report No. 07-004, Dec. 2007, Applied Research Laboratory.
(Continued)

*Primary Examiner* — Julio C. Gonzalez
(74) *Attorney, Agent, or Firm* — Carlson, Gaskey & Olds, P.C.

(57) ABSTRACT

An unmanned underwater vehicle propulsion system includes a turbine engine having a mechanical output, an electrical generator including a mechanical connection to the mechanical output, and an electrical input/output. At least one power bus connects the electrical input/output to one of a motor drive and a motor. A rechargeable energy storage system is connected to the at least one power bus and is configured to provide power to the power bus in at least a first mode and receive power from the power bus in a second mode. A controller is configured to control at least one of the electrical generator, the motor drive, the motor, and the rechargeable energy source.

13 Claims, 5 Drawing Sheets

(51) Int. Cl.
    *H02K 11/33* (2016.01)
    *B63G 8/00* (2006.01)
    *H02K 7/14* (2006.01)
    *H02K 7/18* (2006.01)
    *H02P 27/06* (2006.01)
    *B60L 50/50* (2019.01)
    *F42B 19/10* (2006.01)

(52) U.S. Cl.
    CPC .... *B63B 2758/00* (2013.01); *B63G 2008/002* (2013.01); *F42B 19/10* (2018.08)

(56) References Cited

U.S. PATENT DOCUMENTS

| | | | | |
|---|---|---|---|---|
| 5,214,358 | A * | 5/1993 | Marshall | B60K 6/30 180/65.245 |
| 5,568,023 | A * | 10/1996 | Grayer | B60K 6/30 180/165 |
| 5,684,690 | A | 11/1997 | Levedahl | |
| 5,714,851 | A * | 2/1998 | Antony | B60L 3/003 318/148 |
| 6,188,591 | B1 * | 2/2001 | Ruter | H02J 1/102 363/65 |
| 6,439,831 | B1 * | 8/2002 | Conrad | B63G 8/34 415/1 |
| 8,457,860 | B2 | 6/2013 | Matuszeski et al. | |
| 9,601,970 | B2 | 3/2017 | French et al. | |
| 2005/0223711 | A1 | 10/2005 | Goldmeer et al. | |
| 2008/0182466 | A1 * | 7/2008 | Wegner-Donnelly | B63H 23/24 440/84 |
| 2010/0090626 | A1 | 4/2010 | King | |
| 2011/0080040 | A1 | 4/2011 | Kumar | |
| 2011/0283931 | A1 * | 11/2011 | Moldovanu | B63G 8/00 114/312 |
| 2016/0023773 | A1 | 1/2016 | Himmelmann et al. | |
| 2016/0176534 | A1 | 6/2016 | Himmelmann et al. | |
| 2016/0257416 | A1 | 9/2016 | Himmelmann et al. | |
| 2016/0304214 | A1 | 10/2016 | Himmelmann et al. | |
| 2017/0077759 | A1 * | 3/2017 | Niizuma | H01F 38/14 |
| 2017/0257052 | A1 * | 9/2017 | Yamamoto | B60K 6/445 |
| 2018/0034280 | A1 * | 2/2018 | Pedersen | H02J 5/00 |

OTHER PUBLICATIONS

European Search Report for Application No. 18179673.1 dated Oct. 30, 2018.

* cited by examiner

PULSED POWER HYBRID ELECTRIC UNMANNED UNDERWATER VEHICLE PROPULSION SYSTEM

TECHNICAL FIELD

The present disclosure relates generally to propulsion systems for unmanned underwater vehicles, and more specifically to a pulsed power control scheme for the same.

BACKGROUND

Unmanned underwater vehicles, such as torpedoes, can be deployed from submarines, aircraft, ships, or any similar deployment platform. Once deployed, the unmanned underwater vehicle is propelled towards a target. Historically, unmanned underwater vehicles have been propelled by many different power sources included liquid fuel (such as Otto Fuel) engines, electric motors and batteries, electric motors and fuel cells, chemically heated steam engines, compressed gas engines, and solid rocket motors.

Maximizing an effective range, while also maintaining a sprint speed (maximum high speed) capability, is one goal of unmanned underwater vehicle design, and is impacted by the type of power source utilized to achieve propulsion. The longer the unmanned underwater vehicle's range, the further the deployment platform can be from the target of the unmanned underwater vehicle, protecting the safety of the deployment platform. In addition to the range, a high sprint speed allows the unmanned underwater vehicle to overtake a moving target once the moving target has been alerted to the unmanned underwater vehicle's presence. As is appreciated in the art, most engine configurations trade off effective range for a higher sprint speed, or sprint speed for a higher effective range.

SUMMARY OF THE INVENTION

In one exemplary embodiment an unmanned underwater vehicle propulsion system includes a turbine engine including a mechanical output, an electrical generator including a mechanical connection to the mechanical output, and an electrical input/output, at least one power bus connecting the electrical input/output to one of a motor drive and a motor, a rechargeable energy storage system connected to the at least one power bus and configured to provide power to the power bus in at least a first mode and receive power from the power bus in a second mode, and a controller configured to control at least one of the electrical generator, the motor drive, the motor, and the rechargeable energy source.

In another example of the above described unmanned underwater vehicle propulsion system the at least one power bus comprises, a direct current (DC) bus connecting a first rectifier/inverter to a second rectifier/inverter.

Another example of any of the above described unmanned underwater vehicle propulsion systems further includes an alternating current (AC) bus parallel to the DC bus.

In another example of any of the above described unmanned underwater vehicle propulsion systems the AC bus includes a set of power contactors configured to open and close the AC bus, and wherein the first rectifier/inverter is connected to a generator side of the set of power contactors and the second rectifier/inverter is connected to a motor side of the set of power contactors.

In another example of any of the above described unmanned underwater vehicle propulsion systems the rechargeable energy storage system is connected to the DC bus.

In another example of any of the above described unmanned underwater vehicle propulsion systems the first rectifier/inverter is connected to an electrical output of the electrical generator, and the second rectifier/inverter is connected to an electrical input of the motor drive.

In another example of any of the above described unmanned underwater vehicle propulsion systems the rechargeable energy storage system is connected to the DC bus via a DC to DC converter.

In another example of any of the above described unmanned underwater vehicle propulsion systems the controller includes a memory storing instructions for causing the propulsion system to repeatedly cycle between a turbine operation mode and a DC supply operation mode.

In another example of any of the above described unmanned underwater vehicle propulsion systems the rechargeable energy storage device is configured in a recharge mode while the propulsion system is in the turbine operation mode.

In another example of any of the above described unmanned underwater vehicle propulsion systems the rechargeable energy storage device is configured in a supply power mode while the propulsion system is in the DC supply operation mode.

An exemplary method for driving a propulsor in an unmanned underwater vehicle includes providing electrical power to a motor from a low power energy storage system in a DC supply operation mode, providing electrical power to the motor from a generator in a turbine operation mode, and repeatedly cycling between the DC supply operation mode and the turbine operation mode.

Another example of the above described exemplary method for driving a propulsor in an unmanned vehicle further includes charging the low power energy storage system while in the DC supple operation mode.

Another example of any of the above described exemplary methods for driving a propulsor in an unmanned vehicle further includes transitioning from the DC supply operation mode to the turbine operation mode in response to a stored energy charge of the low power energy storage system falling below a low charge threshold.

In another example of any of the above described exemplary methods for driving a propulsor in an unmanned vehicle the low charge threshold is defined as an amount of charge required to begin operations of a turbine.

In another example of any of the above described exemplary methods for driving a propulsor in an unmanned vehicle transitioning from the DC supply operation mode comprises providing power from the low power energy storage system to the generator, thereby driving rotation of the generator, and using rotation of the generator to initiate a turbine.

Another example of any of the above described exemplary methods for driving a propulsor in an unmanned vehicle further includes transitioning from the turbine operation mode to the DC supply operation mode in response to a stored energy charge of the low power energy storage system being at least equal to a full charge threshold.

In another example of any of the above described exemplary methods for driving a propulsor in an unmanned vehicle repeatedly cycling between the DC supply operation mode and the turbine operation mode comprises alternating between the DC supply operation mode and the turbine operation mode, and wherein a duration of the DC supply operation mode is at least an order of magnitude longer than a duration of the turbine operation mode.

In another example of any of the above described exemplary methods for driving a propulsor in an unmanned vehicle providing electrical power to the motor from the generator in the turbine operation mode comprises providing at least an order of magnitude more power than is provided in the DC supply operation mode.

In another example of any of the above described exemplary methods for driving a propulsor in an unmanned vehicle repeatedly cycling between the DC supply operation mode and the turbine operation mode is performed for a duration of ranged mode operations of the unmanned underwater vehicle.

Another example of any of the above described exemplary methods for driving a propulsor in an unmanned vehicle further includes charging the low power energy storage system in the turbine operation mode using excess energy not required to drive the motor.

These and other features of the present invention can be best understood from the following specification and drawings, the following of which is a brief description.

DETAILED DESCRIPTION OF AN EMBODIMENT

Figure 1:
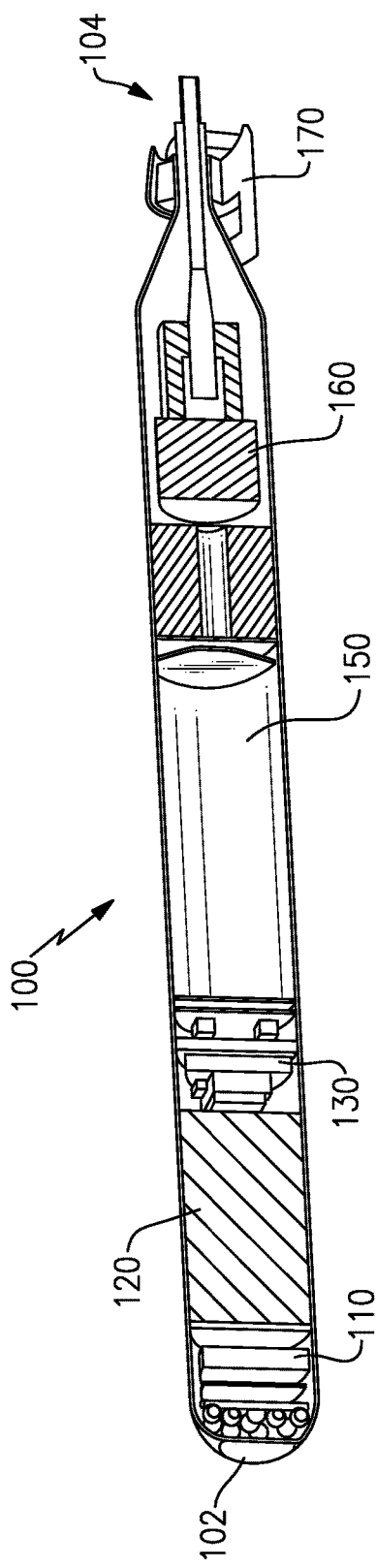
FIG. 1 illustrates a high level schematic view of an exemplary unmanned underwater vehicle including a propulsion system.

FIG. 1 schematically illustrates a cross sectional view of an exemplary unmanned underwater vehicle 100. A forward end 102 of the unmanned underwater vehicle 100 includes a navigation system 110, a payload 120, such as a warhead, and control electronics 130. A mid-section of the unmanned underwater vehicle 100 includes fuel storage tank 150. Alternative example unmanned underwater vehicles utilizing multiple fuel types can include two or more distinct fuel storage tanks, each corresponding to its own fuel type. A rear end 104 of the unmanned underwater vehicle 100 includes a gas turbine engine 160 and a propulsor 170.

Figure 2:
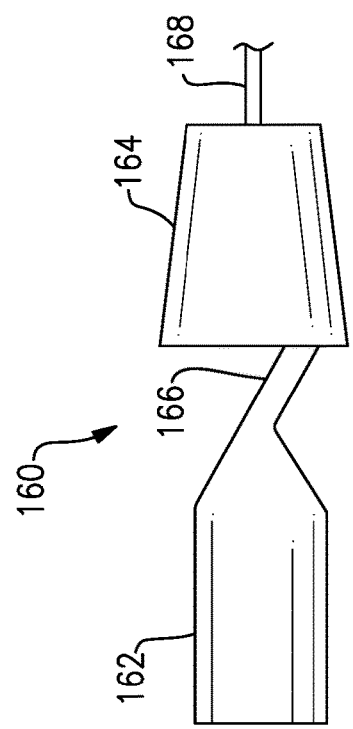
FIG. 2 schematically illustrates an exemplary gas powered turbine for utilization in the unmanned underwater vehicle of FIG. 1.

With continued reference to FIG. 1, and with like numerals indicating like elements, FIG. 2 schematically illustrates an exemplary gas turbine 160, such as could be utilized in the unmanned underwater vehicle 100 of FIG. 1. The gas turbine engine 160 includes a combustor 162 connected to a partial admission axial turbine 164 via a supersonic nozzle 166. Rotational motion generated by the partial admission axial turbine 164 is output via an output shaft 168. In some examples, the output shaft 168 is directly connected to the propulsor 170 (illustrated in FIG. 1), and directly drives rotation of the propulsor 170. In alternative configurations, the output shaft 168 is connected to the propulsor 170 via a geared connection. In the alternative configuration, the geared connection allows a controller, such as the control electronics 130, to adjust the speed at which the propulsor 170 is rotated, thereby controlling the speed of the unmanned underwater vehicle 100. In yet further alternative examples, the output shaft 168 can be connected to alternative systems, such as electrical generators, in addition to or instead of directly to the propulsor 170.

Figure 3:
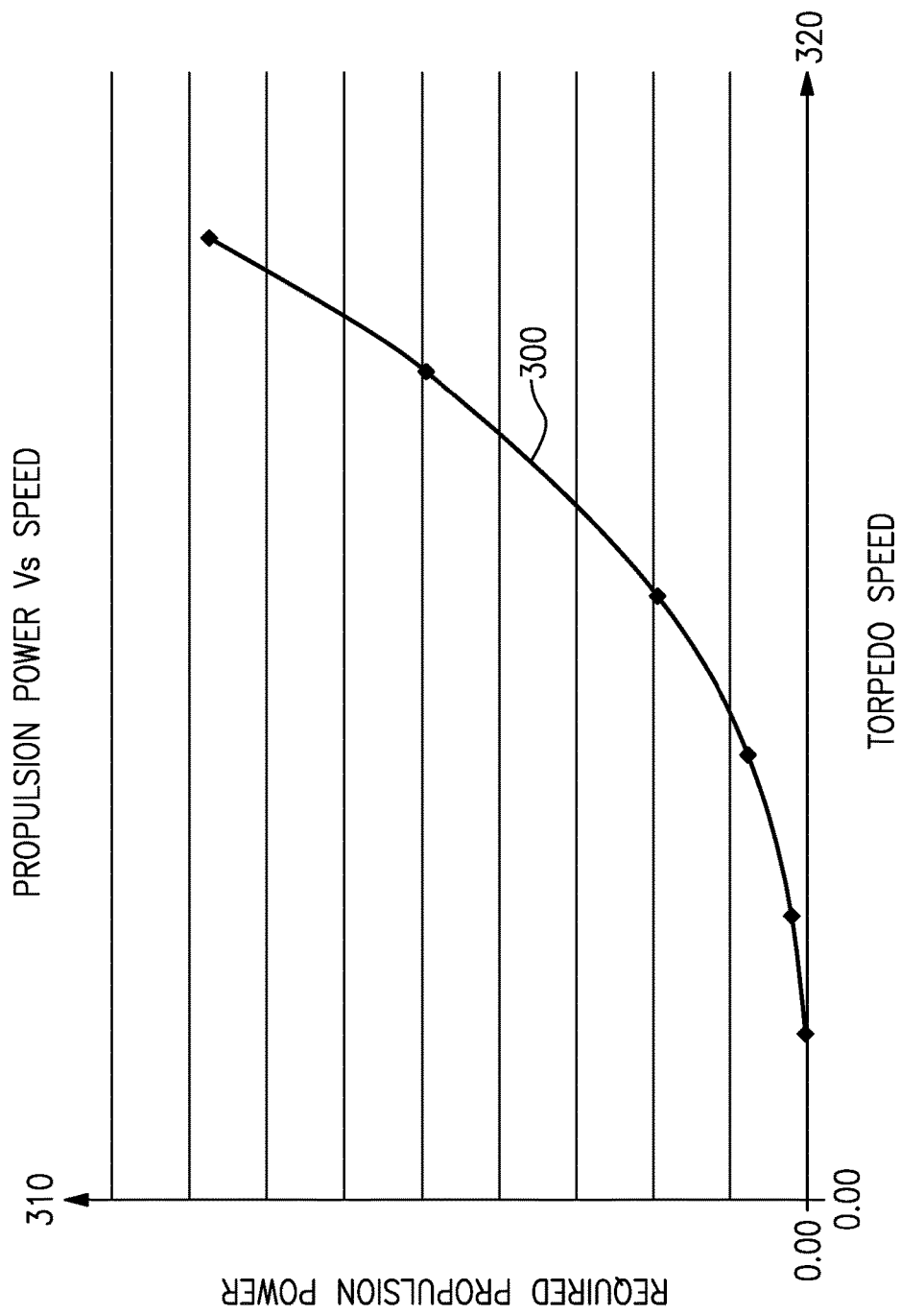
FIG. 3 illustrates a propulsion power vs. speed chart of an exemplary unmanned underwater vehicle.

Once launched, the turbine engine 160 converts chemical energy from the fuel in the fuel tank 150 into mechanical energy by combusting the fuel in a combustor 162 to produce high temperature gas, referred to as a combustion product. The combustion product is expelled through the supersonic nozzle 166 into the partial admission axial turbine 164. The turbine 164 converts the high speed, high temperature, gas into a rotational power which drives rotation of the output shaft 168. The output shaft 168 is connected to the propulsor 170. In the alternative examples utilizing two fuel types, fuel in the first tank 150 and an oxidizer in a second tank are mixed in the combustor 162 and combusted. The control electronics 130 control the operations of the turbine engine 160, as well as any directional controls, or other electronic systems onboard the unmanned underwater vehicle 100. Further, alternative examples utilizing alternative turbine configurations from the described and illustrated partial admission axial turbine 164 can be utilized FIG. 3 illustrates an exemplary propulsion power vs. speed curve 300 of the exemplary unmanned underwater vehicle 100. As can be seen, the curve 300 is non-linear, and the amount of propulsion power (axis 310) required to increase the speed of the unmanned underwater vehicle (axis 320) by a given amount increases exponentially as the current speed of the unmanned underwater vehicle 100 increases. The specific curve 300 illustrated in FIG. 3 is purely exemplary in nature and does not include actual unmanned underwater vehicle propulsion power or speed values. During operation the propulsion power of an unmanned underwater vehicle is related to the unmanned underwater vehicle's forward speed. In order for an unmanned underwater vehicle to operate properly at a very high sprint speed (i.e. with a high maximum velocity), the gas turbine engine 160 has to be capable of providing a very large power level. In order to achieve the exponentially higher power output required for an unmanned underwater vehicle at sprint speed exponentially more fuel must be expended.

Due to the specific power requirements of the unmanned underwater vehicle 100, operation of the unmanned underwater vehicle 100 at slower speeds can increase the range of the unmanned underwater vehicle 100, by requiring less of the fuel to be expended to cover the same distance. Certain combustion engines powered by liquid fuels, such as Otto Fuel, are very efficient at their maximum power design point, allowing for high speed operation, however their efficiency degrades at lower power levels resulting in less fuel saved by operating at low speed than if the combustion engine could maintain a high efficiency while operating at low power. This phenomenon yields a reduction in underwater vehicle range.

Figure 4:
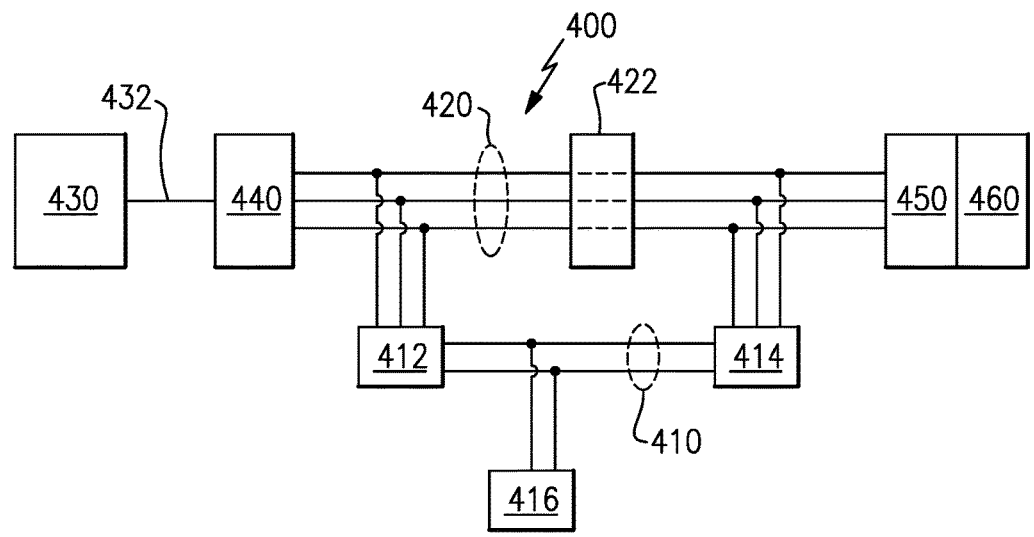
FIG. 4 schematically illustrates a hybrid AC/DC bus propulsion system architecture an unmanned underwater vehicle mechanically decoupling a turbine from a propulsor.

In some examples, such as a series hybrid propulsion architecture, it is desirable to mechanically decouple the propulsor 170 from the turbine engine 160. With continued reference to FIG. 1, FIG. 4 schematically illustrates an exemplary series hybrid propulsion system 400 including a direct current (DC) bus 410 and an alternating current (AC) bus 420. A turbine engine 430, such as the turbine engine 160 of FIG. 1, includes a mechanical output 432 connected to an electrical generator 440. The electrical generator 440 is, in some examples, a voltage controlled permanent magnet generator. In alternative examples, the electrical generator 440 can be any type of voltage controlled generator.

The electrical generator 440 outputs poly phase AC power to the AC bus 420. Also connected to the AC bus 420 is a motor 450, such as an induction motor. The motor 450 receives poly phase power from the AC bus 420 and drives rotation of a propulsor 460 that is mechanically connected to the motor 450. A set of power contactors 422 are disposed on, and interrupt, the AC bus 420. While the power contactors 422 are in an open state, the AC bus 420 is open, and is incapable of transmitting power. While the power contactors 422 are in a closed state, the AC bus 420 is closed and passes power directly from the generator 440 to the motor 450. In the example propulsion system 400, three phase power is utilized. In alternative systems, any number of balanced phases can be utilized to similar effect.

Also present in the series hybrid propulsion system 400 is a DC bus 410. The DC bus 410 is connected to the AC bus 420 via a first bi-directional inverter/rectifier 412 and a second bi-directional inverter/rectifier 414. A rechargeable low power energy storage system 416, such as a lithium ion battery or an ultracapacitor is connected to the DC bus 410 and provides or stores excess DC power.

Figure 5:
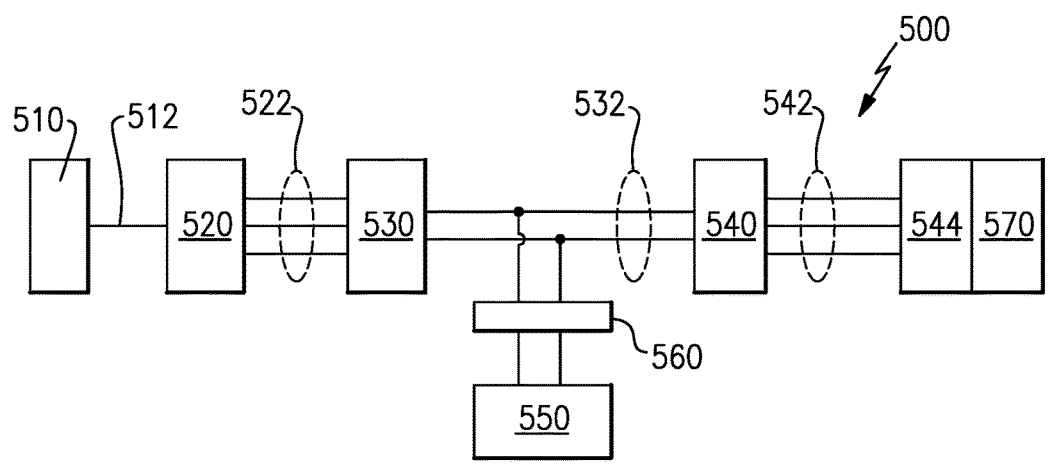
FIG. 5 schematically illustrates a DC bus based propulsion system architecture for an unmanned underwater vehicle mechanically decoupling a turbine from a propulsor.

In alternative pulsed control propulsion systems, the turbine can be mechanically decoupled from the propulsor via a DC bus only configuration. FIG. 5 schematically illustrates an exemplary propulsion system 500 including a mechanically decoupled turbine engine 510. The propulsion system 500 includes a turbine engine 510, such as the partial axial admission turbine 160 described above. A rotational output 512 of the turbine 510 is connected to an electrical generator 520. In one example, the electrical generator 520 is a permanent magnet generator (PMG) configured to operate in either an electrical generation mode or an electrical motor mode depending on the operational state of the unmanned underwater vehicle 100.

The electrical generator 520 converts the input rotational power into a poly-phase AC output 522. In the exemplary system, the poly phase AC output 522 is three phase. In alternative systems, any other balanced poly phase AC output can be generated and used with minor modification to the exemplary system. A bi-directional active rectifier/inverter 530 accepts the AC output 522 from the generator 520, and converts the AC output 522 into DC power. The DC power is provided across a DC bus 532 to a DC to AC motor drive 540. The DC to AC motor drive 540 converts the DC power into an operational poly phase output 542, which drives a permanent magnet motor 544. In alternative examples, the permanent magnet motor 544 could be replaced with alternative motor types including induction motors. The permanent magnet motor 544 is mechanically connected to the propulsor 570, and drives rotation of the propulsor 570. Also tied to the DC bus 532 is a rechargeable energy storage system 550, such as a lithium ion battery or an ultracapacitor. In the illustrated example of FIG. 4, the energy storage system 550 is connected to the DC bus 532 via a DC to DC converter 560. The DC to DC converter 560 adjusts the voltage level output from the energy storage system 550 to match the voltage level of the DC bus 532. In examples where the rectifier/inverter 530 are active, such as the illustrated example, the DC to DC converter 560 can be omitted and the DC bus voltage is controlled via the active rectifier/inverter 530. In alternative examples where the active rectifier/inverter 530 is passive, the DC to DC converter 560 should be included.

With reference to the examples of FIGS. 4 and 5 together, in some exemplary embodiments, the control electronics 130 control all of the components of the propulsion system 400, 500. In alternative embodiments, the propulsion system 400, 500 can include an additional, dedicated, controller communicatively coupled to each of the components of the propulsion system 400, 500 and the operations of the propulsion system 400, 500 can be controlled via the dedicated controller. In yet a further example, the dedicated controller may be utilized in communication with, and operate in conjunction with, the control electronics 130.

Figure 6:
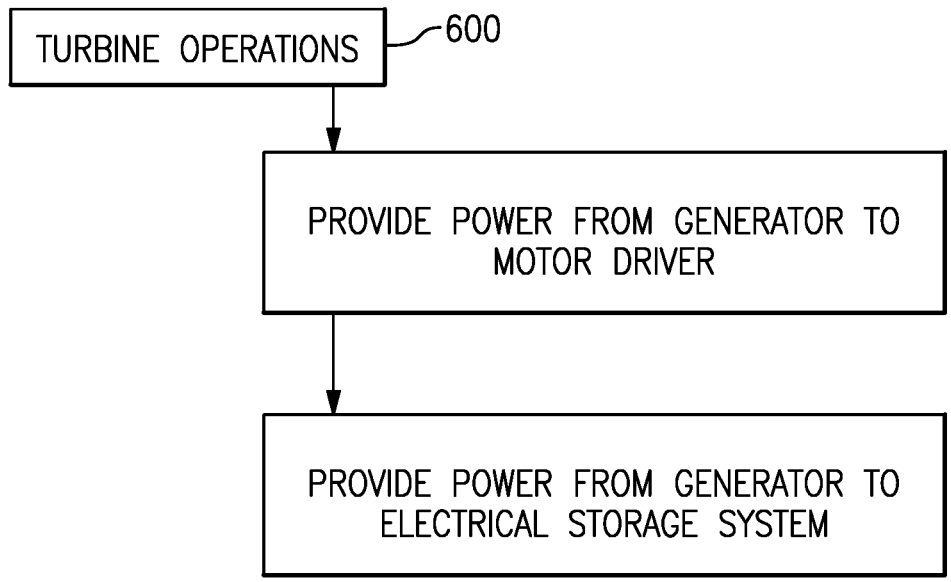
FIG. 6 illustrates the provision of power in a propulsion system during turbine operations.
Figure 7:
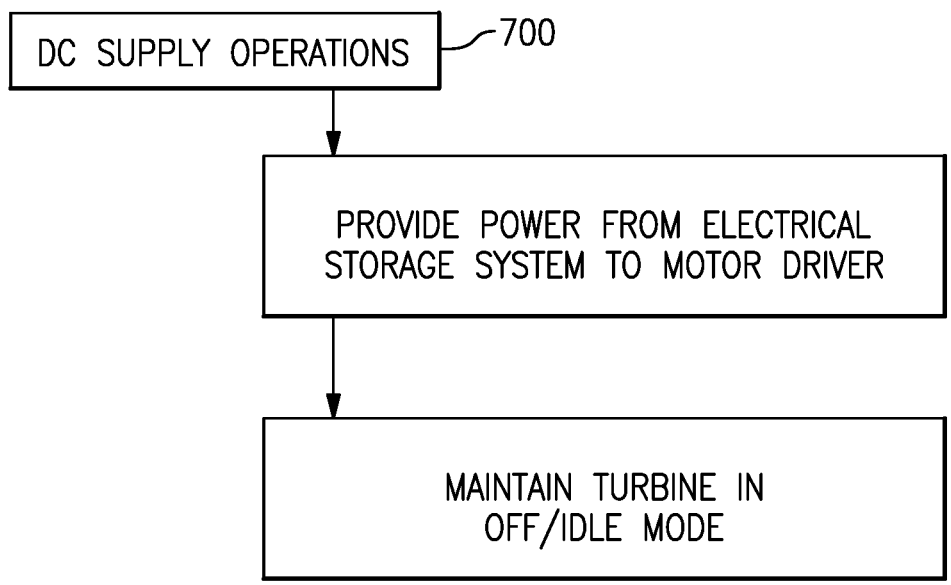
FIG. 7 illustrates the provision of power in a propulsion system during low power energy supply (DC supply) operations.

In both the example propulsion systems 400, 500, the propulsor 460, 570 can be driven by either turbine operations or by low power energy (DC supply) supply operations. FIG. 6 illustrates the provision of power in the turbine operations 600, while FIG. 7 illustrates the provisions of power during low power energy supply (DC supply) operations 700.

While in the turbine supply operations 600, electrical power is generated via the translation of rotational power from the operating turbine 430, 510 to the generator 440, 520. This power is passed across the AC bus 420 to the motor 450 in the example of FIG. 4, and across the DC bus 532 to the motor driver 540 in the example of FIG. 5. Simultaneous with driving the propulsor 460, 570 during the turbine mode of operations 600, the rechargeable low power energy storage system 416, 550 is recharged from power that is transmitted to the corresponding DC bus 410, 532. As the turbine 430, 510 generates extreme levels of power, relative to the storage capacity of the rechargeable energy storage system 416, 450, the time from recharging to fully charged is relatively minimal.

By way of example only, using a 10 kW hr battery would provide a low power range mode (12 knots, which requires about 3 kw of propulsion power) for about 1 hr. Then, starting the engine would provide 600 kw of power for re-charge, which could re-charge the battery, or other power storage element, in approximately 1 minute.

In contrast, during the DC supply operations 700 power is provided from the rechargeable low power energy storage system 416, 550 to the motor driver 544 (in the example propulsion system 500 of FIG. 5) or to the motor 450 (in the example propulsion system 400 of FIG. 4). While in DC supply operations 700, the turbine 430, 510 is either turned off entirely, or is idled resulting in the turbine not driving rotation of the generator 440, 520. By idling or shutting off the turbine 430, 510, the propulsion system 400, 500 can conserve fuel allowing the propulsion system to operate at maximum low speed efficiency by drawing from the rechargeable low power energy storage system 416, 550.

Figure 8:
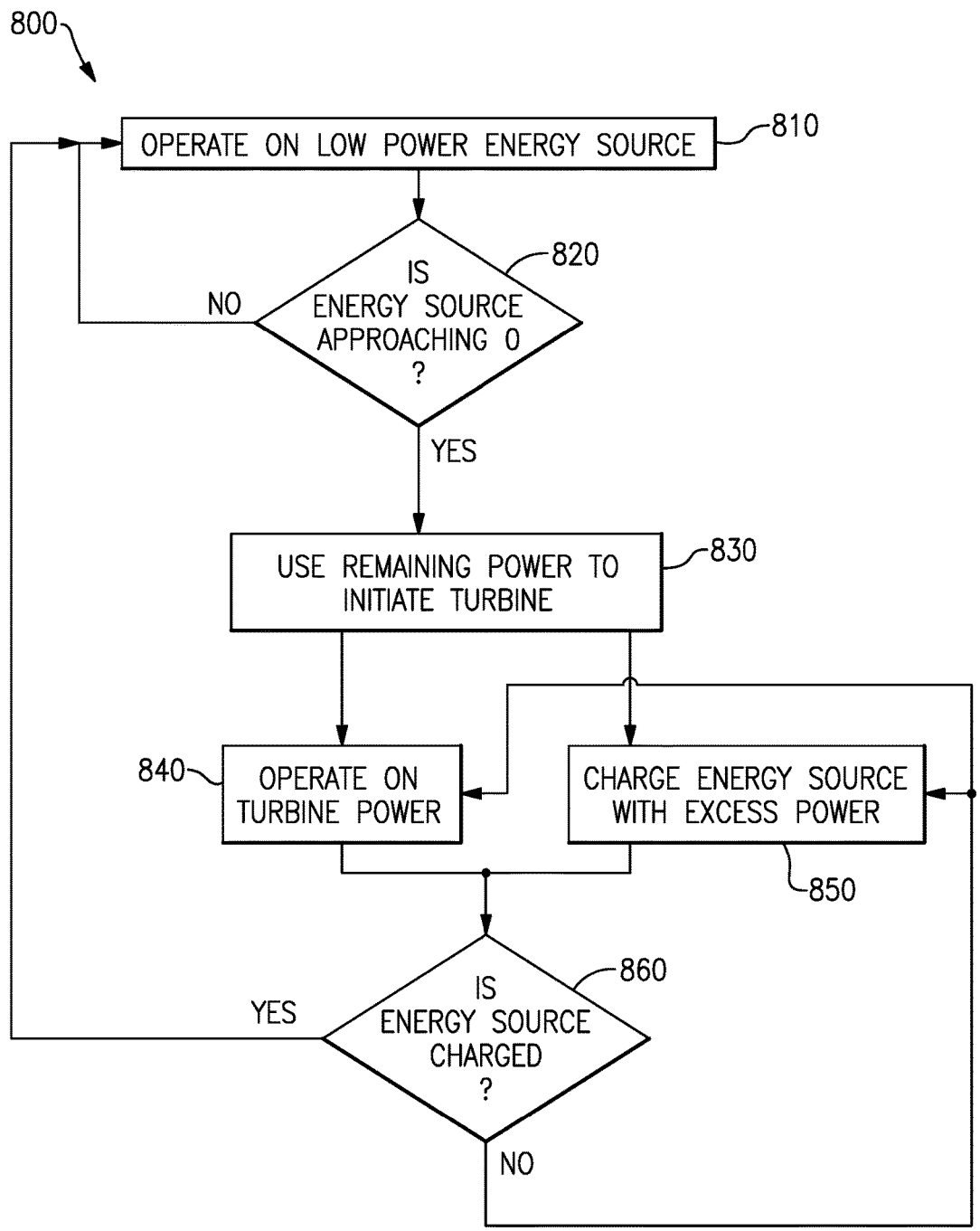
FIG. 8 illustrates a flowchart of pulse powered operations.

While the unmanned underwater vehicle 100 is in a range mode, and thus traveling at a slow speed, turbine operations are inefficient. However, DC supply operations are limited in duration by the size of the low power energy storage system 416, 550. In order to extend the range of the unmanned underwater vehicle 100 the propulsion system 400, 500 can be configured in a pulse powered turbine configuration. Operations within a pulse turbine configuration are illustrated in flowchart 800 of FIG. 8.

Initially, when the unmanned underwater vehicle 100 is launched, the propulsion system 400, 500 operates using the energy stored in the low power energy storage system 416, 550 in an "Operate on Low Power Energy storage system"

step 810. The control electronics 130 monitor the charge of the low power energy storage system 416, 550 in an "Is Energy Source Approaching 0" check 820. While the low power energy storage system 416, 550 remains above a predefined threshold, the check 820 determines that the low power energy storage system 416, 550 is not approaching 0, and continues to operate on the low power energy storage system 416, 550. In one example, the predefined threshold is a magnitude of power required to start the turbine 430, 510.

When the low power energy storage system 416, 550 falls below the threshold, the check 820 determines that the low power energy storage system is approaching 0, and the controller 130 causes the propulsion system 400, 500 to transition to turbine operations. The transition is achieved by initially utilizing the remaining electrical power within the low power energy storage system 416, 550 to initiate the turbine 430, 510 in a "Use Remaining Power to Initiate Turbine" step 830. Once the turbine 430, 510 has begun self-sufficient operations, the propulsion system 400, 500 simultaneously powers the propulsor 460, 570 using electricity generated by the generator 440, 520 connected to the turbine 430, 510 in an "Operate on Turbine Power" step 840, and charges the low power energy storage system 416, 550 in a "Charge Energy Source with Excess Power" step 850.

While in the turbine operations, the controller 130 checks to determine when the low power energy storage system 416, 550 is fully charged, or is charged above a charging threshold in an "Is Energy Source Charged" check 860. While the low power energy storage system 416, 550 is below the threshold, or is not fully charged, the propulsion system 400, 500 maintains operations in the turbine mode. When the charge level of the low power energy storage system 416, 550 exceed the threshold, or the low power energy storage system 416, 550 is fully charged, the controller 130 causes the propulsion system to transition back into the DC power supply operations, as described above.

The cycling of the turbine 430, 510 in short bursts to charge the low power energy storage system is referred to as pulsing the turbine 430, 510. During the pulsing operations, the turbine 430, 510 is utilized in very short time periods, relative to the length of DC supply operations. Further, as the chemical fuel for the turbine 430, 510 is substantially more energy dense, the unmanned underwater vehicle 100 can achieve substantially longer operations using the range mode by converting chemical energy into electrical energy and storing the excess electrical energy, in the pulsed operation described above, than an equivalent weight and/or volume of electrical energy storage.

While described above within the context of a torpedo 100, it should be understood that the propulsion system 400, 500 can be included within any type of unmanned underwater vehicle, and is not limited to torpedo applications. It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An unmanned underwater vehicle propulsion system comprising:
   a turbine engine including a mechanical output and a combustor connected to a partial admission axial turbine via a supersonic nozzle;
   an electrical generator including a mechanical connection to the mechanical output, and an electrical input/output;
   at least one power bus connecting the electrical input/output to one of a motor drive and a motor;
   a rechargeable energy storage system connected to the at least one power bus and configured to provide power to the power bus in at least a first mode and receive power from the power bus in a second mode; and
   a controller configured to control at least one of the electrical generator, the motor drive, the motor, and the rechargeable energy source.

2. The unmanned underwater vehicle of claim 1, wherein the combustor is connected to a first tank and a second tank such that a fuel in the first tank and an oxidizer in the second tank are mixed in the combustor.

3. The unmanned underwater vehicle of claim 1, wherein the electrical generator is a voltage controlled permanent magnet generator.

4. The unmanned underwater vehicle of claim 1, further comprising a propulsor drivably connected to the motor.

5. The unmanned underwater vehicle propulsion system of claim 1, wherein the at least one power bus comprises, a direct current (DC) bus connecting a first rectifier/inverter to a second rectifier/inverter.

6. The unmanned underwater vehicle propulsion system of claim 5, further comprising an alternating current (AC) bus parallel to the DC bus.

7. The unmanned underwater vehicle propulsion system of claim 6, wherein the AC bus includes a set of power contactors configured to open and close the AC bus, and wherein the first rectifier/inverter is connected to a generator side of the set of power contactors and the second rectifier/inverter is connected to a motor side of the set of power contactors.

8. The unmanned underwater vehicle propulsion system of claim 6, wherein the rechargeable energy storage system is connected to the DC bus.

9. The unmanned underwater vehicle propulsion system of claim 5, wherein the first rectifier/inverter is connected to an electrical output of the electrical generator, and the second rectifier/inverter is connected to an electrical input of the motor drive.

10. The unmanned underwater vehicle propulsion system of claim 9, wherein the rechargeable energy storage system is connected to the DC bus via a DC to DC converter.

11. The unmanned underwater vehicle propulsion system of claim 1, wherein the controller includes a memory storing instructions for causing the propulsion system to repeatedly cycle between a turbine operation mode and a DC supply operation mode.

12. The unmanned underwater vehicle of claim 11, wherein the rechargeable energy storage device is configured in a recharge mode while the propulsion system is in the turbine operation mode.

13. The unmanned underwater vehicle of claim 11, wherein the rechargeable energy storage device is configured in a supply power mode while the propulsion system is in the DC supply operation mode.

* * * * *